US008407041B2

United States Patent
Deng et al.

(10) Patent No.: US 8,407,041 B2
(45) Date of Patent: Mar. 26, 2013

(54) INTEGRATIVE AND DISCRIMINATIVE TECHNIQUE FOR SPOKEN UTTERANCE TRANSLATION

(75) Inventors: Li Deng, Redmond, WA (US); Yaodong Zhang, Boston, MA (US); Alejandro Acero, Bellevue, WA (US); Xiaodong He, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 12/957,394

(22) Filed: Dec. 1, 2010

(65) Prior Publication Data

US 2012/0143591 A1 Jun. 7, 2012

(51) Int. Cl.
*G06F 17/28* (2006.01)
(52) U.S. Cl. .......................................................... 704/2
(58) Field of Classification Search .................. 704/2
See application file for complete search history.

(56) References Cited

U.S. PATENT DOCUMENTS

| 6,567,776 | B1 * | 5/2003 | Chang et al. ................. 704/236 |
| 7,593,843 | B2 * | 9/2009 | Aue et al. ........................... 704/2 |
| 7,856,351 | B2 * | 12/2010 | Yaman et al. ..................... 704/9 |
| 8,296,127 | B2 * | 10/2012 | Marcu et al. ...................... 704/5 |
| 2008/0052075 | A1 | 2/2008 | He et al. |
| 2010/0125457 | A1 | 5/2010 | Gilbert et al. |

OTHER PUBLICATIONS

Matusov, et al., "On the Integration of Speech Recognition and Statistical Machine Translation", Retrieved at <<http://www1.cs.columbia.edu/~amaxwell/candidacy/s2s_trans/matusov2005.pdf>> 2005.

Jiang, Hui, "Discriminative training of HMMs for automatic speech recognition: A survey", Retrieved at <<http://www.cse.yorku.ca/~hj/mypubs/Jiang_DT_Survey.pdf>> In the Proceedings of Computer Speech & Language, vol. 24, Issue 4, Aug. 2009.

Dong, "Large-Margin Minimum Classification Error Training for Large-Scale Speech Recognition Tasks", Retrieved at << http://research.microsoft.com/en-us/um/redmond/groups/srg/papers/2007-dongyu-icassp.pdf>> In the Proceedings of the ICASSP, Apr. 2007.

Yaman, et al., "An Integrative and Discriminative Technique for Spoken Utterance Classification", Retrieved at <<http://www.icsi.berkeley.edu/~sibel/TASL-SUC.pdf>> In the proceedings IEEE Transactions of Audio, Speech and Language Processing, vol. 16, Issue 6, Aug. 2008.

Kirchhoff, et al., "Semi-Automatic Error Analysis for Large-Scale Statistical Machine Translation", Retrieved at <<http://www.mt-archive.info/MTS-2007-Kirchhoff.pdf>> 2007.

(Continued)

Primary Examiner — Susan McFadden

(57) ABSTRACT

Architecture that provides the integration of automatic speech recognition (ASR) and machine translation (MT) components of a full speech translation system. The architecture is an integrative and discriminative approach that employs an end-to-end objective function (the conditional probability of the translated sentence (target) given the source language's acoustic signal, as well as the associated BLEU score in the translation, as a goal in the integrated system. This goal defines the theoretically correct variables to determine the speech translation system output using a Bayesian decision rule. These theoretically correct variables are modified in practical use due to known imperfections of the various models used in building the full speech translation system. The disclosed approach also employs automatic training of these variables using minimum classification error (MCE) criterion. The measurable BLEU scores are used to facilitate the implementation of the MCE training procedure in a step that defines the class-specific discriminant function.

20 Claims, 8 Drawing Sheets

OTHER PUBLICATIONS

Ney, et al., "Error Measures and Bayes Decision Rules Revisited with Applications to POS Tagging", Retrieved at <<http://www.aclweb.org/anthology/W/W04/W04-3235.pdf>> In the proceedings of Empirical Methods for Natural Language Processing, 2004.

Matusov, et al., "Integrating Speech Recognition and Machine Translation: Where Do We Stand?", Retrieved at <<http://ieeexplore.ieee.org/stamp/stamp.jsp?tp=&arnumber=1661501>> In the proceedings of Acoustics, Speech and Signal Processing, 2006.

"Speech Translation: Coupling of Recognition and Translation", Retrieved at <<http://ieeexplore.ieee.org/stamp/stamp.jsp?tp=&arnumber=758176>> In the proceedings of Acoustics, Speech, and Signal Processing, 1999.

* cited by examiner

INTEGRATIVE AND DISCRIMINATIVE TECHNIQUE FOR SPOKEN UTTERANCE TRANSLATION

BACKGROUND

The predominant approach in a speech translation system is the direct cascade of separate automatic speech recognition (ASR) and machine translation (MT) components, where the single ASR output as a word string is input to the MT system for translation. Spoken utterance translation (SUT) is a challenging task for machines to automatically convert speech input in one language to text output in another language. A straightforward approach to addressing this challenge is to build a two-stage system, which combines the state-of-the-art techniques from ASR and statistical MT (SMT). Specifically, in this two-stage system, the ASR engine first recognizes the speech input and outputs the recognition hypotheses in text. The SMT engine then takes the recognition hypotheses as input and outputs translated text in a specified target language. However, this has drawbacks because the errors made in ASR cannot be recovered in MT.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture integrates of automatic speech recognition (ASR) and machine translation (MT) components of a full speech translation system. The architecture is an integrative scoring and discriminative training approach that employs an end-to-end objective function (the conditional probability of the translated sentence (target) given the source language's acoustic signal), as well as the associated BLEU (bilingual evaluation understudy) score in the translation, as a system optimization goal in the integrated system. This goal determines the correct system variables to determine the output of the speech translation system using a Bayesian decision rule. The disclosed approach also employs automatic training of these variables using minimum classification error (MCE) criterion. The measurable BLEU scores are used to facilitate the implementation of the MCE training procedure.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
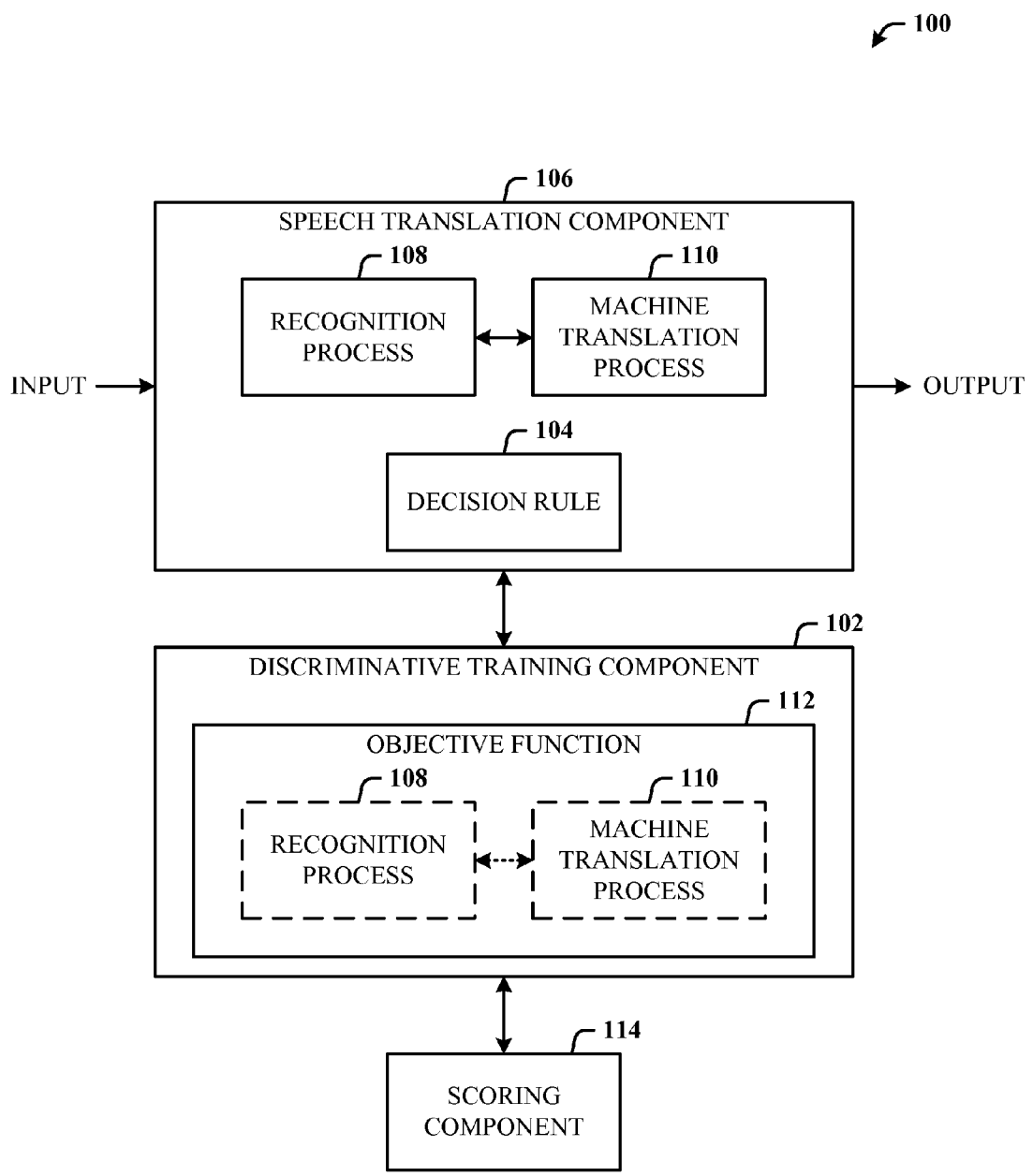
FIG. 1 illustrates a translation system in accordance with the disclosed architecture.

The disclosed architecture is an integrative and discriminative approach that serially combines several components of a single large probabilistic system, such as used for speech translation. Bayesian decision rule(s) or other general principles can be used to define the decision variables to determine the output of the speech translation system.

For example, the integrative framework can be provided for building a spoken utterance translation (SUT) system by using existing automatic speech recognition (ASR) and a machine translation (MT) system (e.g., statistical). The architecture integrates acoustic scores, language model scores, and translation scores to refine the translation hypotheses and determine the best translation candidate. Since parameters in ASR and SMT systems are optimized individually before the combination, a minimum classification error (MCE) training approach is applied to jointly optimize parameters in both ASR and MT systems, to further improve the translation performance.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a training system 100 for speech translation in accordance with the disclosed architecture. The system 100 includes a discriminative training component 102 that is derived from a decision rule 104 of a speech translation component 106, the speech translation component 106 recognizes speech input using a speech recognition process 108 and translates a recognition output to multiple hypotheses as translation output using a machine translation process 110. The discriminative training component 102 includes an objective function 112 that integrates the recognition process 108 and the machine translation process 110.

The system 100 can further comprise a scoring component 114 that scores the multiple hypotheses of the machine translation process 110 based on the decision rule 104 and outputs a final set of translated output from the multiple hypotheses. The decision rule 104 defines decision variables to determine the output of the translation component 106. The decision rule 104 can be a Bayesian decision rule. The decision rule 104 includes a translation score, acoustic score, and language model score to refine the multiple hypotheses and determine a translation candidate. The decision variables are automatically trained using minimum classification error criterion to optimize parameters in the recognition process 108 and the machine translation process 110. The training component 102 utilizes a class-discriminant function, a class-specific misclassification function, and/or smoothing function from which is derived a total loss function. The training component 102 utilizes gradient-based training on the objective function 112 to update the variables.

Following is a general description of the disclosed end-to-end translation architecture as applied to speech utterance translation from a Chinese language input to English. It is to be understood, however, that the disclosed translation architecture can be applied to any language translation application with any pair of two languages in the world.

On the following example, Bayesian rules are followed to derive the integrative framework for the SUT task. Assuming the task is to translate Chinese speech utterances to English text, the statistical form can be written as, $$\hat{E}_r = \underset{E_r}{\operatorname{argmax}} P(E_r \mid X_r)$$

where $X_r$ denotes the (r-th) speech input (of the source language, e.g., Chinese), and $C_r$ the corresponding text. Let $E_r$ denote the translated text in the target language (e.g., English) from source text $C_r$.

Then, the following Bayesian formalism and approximations are:

$$\begin{aligned}
\hat{E}_r &= \underset{E_r}{\operatorname{argmax}} P(E_r \mid X_r) \\
&= \underset{E_r}{\operatorname{argmax}} \sum_{C_r} P(E_r, C_r \mid X_r) \\
&= \underset{E_r}{\operatorname{argmax}} \sum_{C_r} P(E_r \mid C_r, X_r) P(X_r \mid C_r) P(C_r) \\
&\approx \underset{E_r}{\operatorname{argmax}} \sum_{C_r} P(E_r \mid C_r) P(X_r \mid C_r) P(C_r) \\
&\approx \underset{E_r}{\operatorname{argmax}} \left[ \underset{C_r}{\max} P(E_r \mid C_r) P(X_r \mid C_r) P(C_r) \right]
\end{aligned}$$

Three probabilities are derived: $P(E_r|C_r)$, $P(X_r|C_r)$, and $P(C_r)$ in the product form, or equivalently, in the form of sum of logarithm. The probabilities can be used as the decision variables to determine the speech translation system output.

The next stage involves the procedure to determine all the above relevant probabilities automatically from a set of training data, including the n-best list of the ASR output. MCE training is designed for this purpose.

In the first step of MCE training, a class-discriminant function is defined as the following:

$$D(E_r, C_r; X_r) = \log\left[P(E_r|C_r) P(X_r|C_r) P(C_r)\right]$$

A class-specific misclassification function is then defined:

$$d(X_r) = -D(E_r^0, C_r^0; X_r) + \log\left[\frac{1}{|U_r|} \sum_i^{|U_r|} \exp(\eta D(E_r^i, C_r^i; X_r))\right]^{\frac{1}{\eta}}$$

where $E_r^i$ is the target sentence that has the highest BLEU (bilingual evaluation understudy) score based on the training reference set compared with all others obtained from the MT system with the inputs from all n-best hypotheses of ASR to this r-th training sentence.

The smoothing function is then defined:

$$l_r(X_r) = \frac{1}{1 + \exp(-\alpha d_r(X_r) + \beta)}$$

from which the total loss function is derived:

$$L = \sum_r l_r(X_r)$$

This is the objective function for the MCE training. After computing the gradient in a closed form, the gradient descent is used to update the variables $P(E_r|C_r)$, $P(X_r|C_r)$, and $P(C_r)$, iteratively, using the training set.

Figure 2:
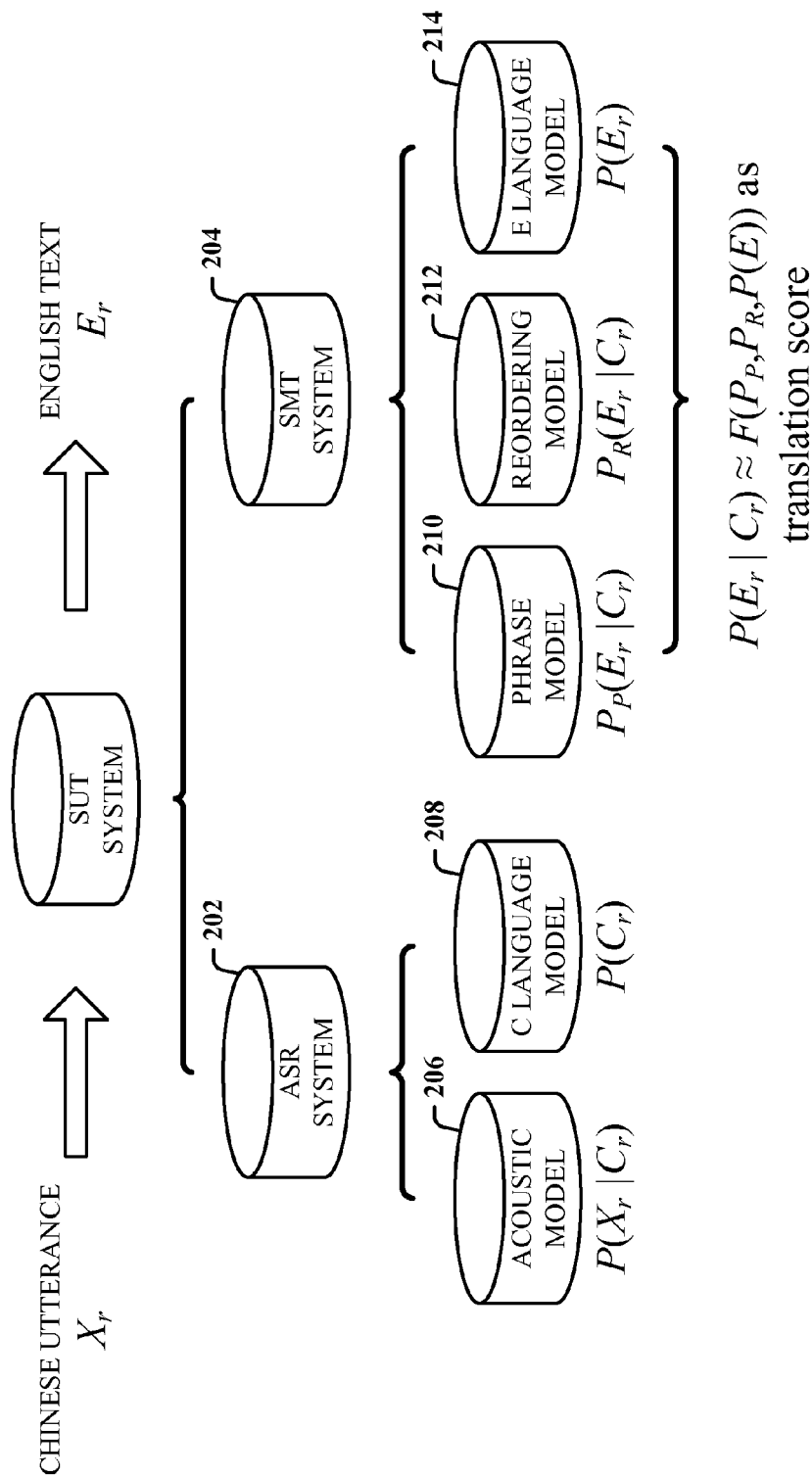
FIG. 2 illustrates all probabilistic quantities in a translation system for spoken utterance translation from Chinese language speech to English language text.

FIG. 2 illustrates all probabilistic quantities in a translation system 200 for spoken utterance translation from Chinese language speech to English language text. As depicted, the SUT system 200 combines and ASR system 202 and an SMT system 204. The ASR system 202 is shown as comprising an acoustic model 206 and a Chinese language model 208. The SMT system 204 is shown as comprising a phrase model 210, a reordering model 212, and an English language model 214. As annotated, the translation score for the translated output of the SMT system 204 is based on the phrase model 210, reordering model 212, and the English language model 214.

Figure 3:
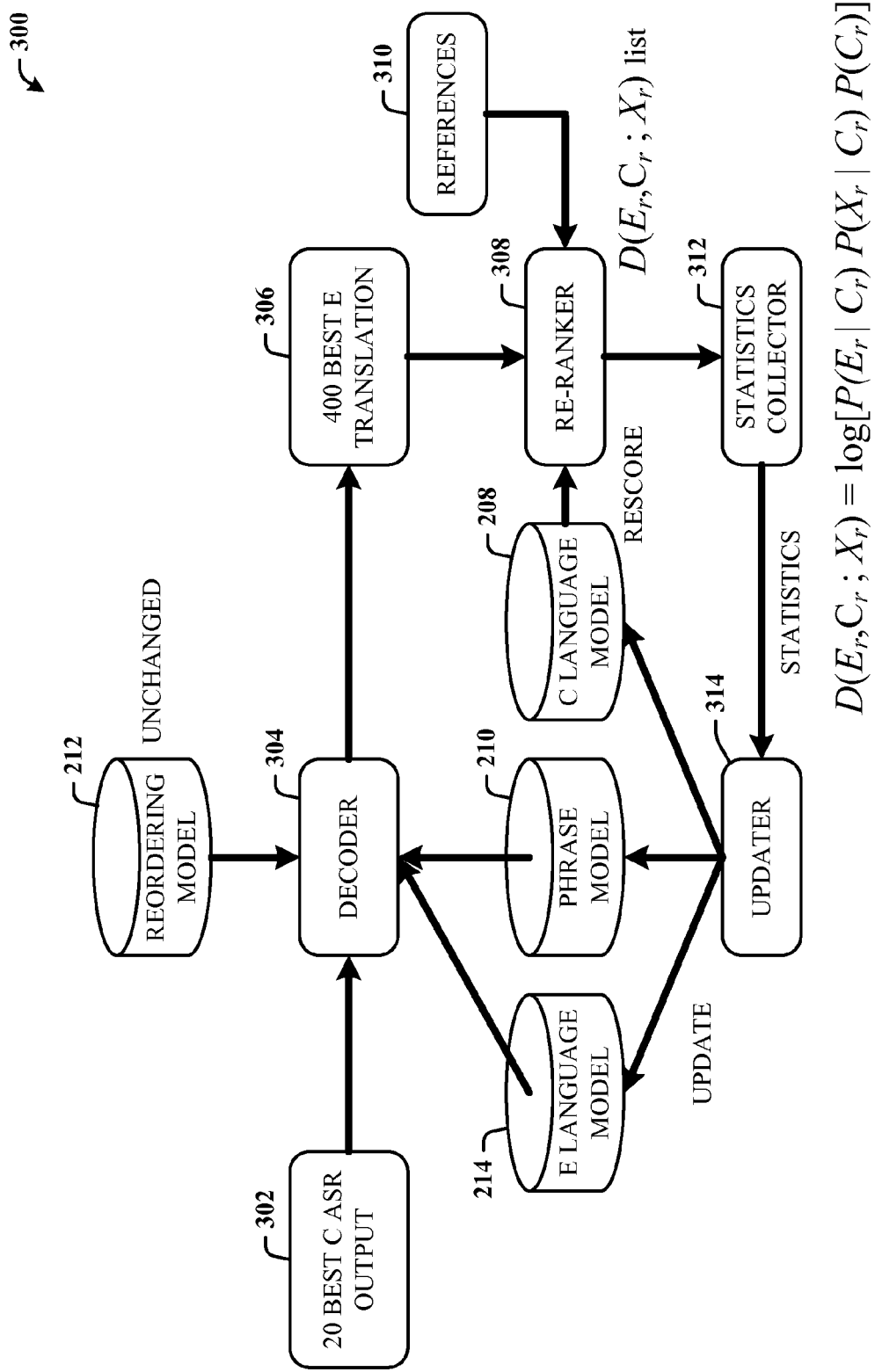
FIG. 3 illustrates data flow diagram in training of a translation system.

FIG. 3 illustrates data flow diagram 300 in MCE training of a translation system. Although using the integrative scoring framework takes into account probability contributions from both ASR and SMT systems, the direct combination approach still has one problem that parameters in the ASR and SMT systems are optimized towards their own best instead of the combined performance.

To solve this problem, an MCE training method is introduced to update parameters in the ASR and SMT systems directly based on the combined SUT performance. The expectation is that the MCE training could update parameters in the way that both ASR and SMT systems can work jointly towards producing better SUT results.

In this particular example, the best language outputs 302 (also referred to as ASR or recognition hypotheses) (e.g., Chinese) from an ASR are received into a translation system decoder 304. In order to accomplished the decoding, the decoder 304 receives (or accesses) a number of resources, such as the phrase model 210, the reordering model 212, and the English language model 214. The output of the decoder 304 is the n-best list of English language text translations 306 (also referred to as translation hypotheses).

The translations 306 are then passed to a re-ranker component 308 to rank the translations 306 based on updated statistics. The re-ranker component 308 receives (or accesses) resources such as the Chinese language model 308 and a references component 310. Given a translation reference (of the references 310), a score (e.g., BLEU) can be computed. The scores are computed at the sentence level, and the scores are then passed to a statistics collector 312. Based on the statistics obtained from the collector 312, an updater 314 receives the statistics and updates the Chinese language model 208, the phrase model 210, and the English language model 214. The updated English language model 214 and phrase model 210 are then utilized for the next set of ASR output 302. The updates to the Chinese language model 208 are then employed for rescoring by the re-ranker component 308. This process continues iteratively.

Following is additional detailed description related to MCE training, the MCE objective function, and model updating. The integrative scoring framework takes into account probability contributions from both ASR and SMT systems. The direct combination approach employs an MCE training method to update parameters in the ASR and SMT systems, directly, based on the combined SUT performance. The expectation is that the MCE training updates parameters in the way that both ASR and SMT systems can work jointly towards producing better SUT results.

Formally, to introduce the MCE training framework, the class-discriminant function D(•) is defined as, $$D(E_r, C_r; X_r) = \log[P(E_r|C_r)P(X_r|C_r)P(C_r)]$$

The function $D(E_r, C_r; X_r)$ defines the integrative probability of a translated English sentence $E_r$ and its corresponding Chinese recognition hypothesis $C_r$ given a Chinese utterance input $X_r$. Viewing the SUT task as a common pattern classification problem that classifies each $X_r$ into different $(E_r, C_r)$ pairs, this function acts as the scoring function of each classification decision, $$X_r \rightarrow (E_r, C_r)$$

In order to judge the goodness of each classification decision $(E_r, C_r)$, the commonly used BLEU evaluation on $E_r$ is applied in each $(E_r, C_r)$ pair. Given the translation reference $R_r$, the BLEU scoring function is defined as, $$BLEU(R_r, E_r)$$

A smoothed version of BLEU score is adopted and defined at the sentence level. Since the BLEU averages the n-gram appearance in the test translation against reference translations, it is possible for different translation candidates $E_r^i$ having the same BLEU score. As a result, the BLEU score is not enough to determine the best $(E_r, C_r)$ pair. To fix this, for decision pairs $(E_r^1, C_r^1)$ and $(E_r^2, C_r^2)$, when $BLEU(E_r^1) = BLEU(E_r^2)$, the pair with higher D(•) (the class-discriminant function) score is chosen as the best decision.

Formally, the correct classification decision pair $(E_r, C_r)$ can be determined. In a first step, from the translation hypothesis set $T_r$ for the input spoken utterance $X_r$, the best translated English sentence $E_r^0$ is selected by, $$E_r^0 = \arg\max_{E_r^i \in T_r} BLEU(R_r, E_r^i)$$

In a second step, from the speech recognition hypothesis set $S_r$, $C_r^0$ is selected by, $$C_r^0 = \arg\max_{C_r^i \in S_r} D(E_r^0, X_r)$$

Intuitively, selecting the correct classification pair $(E_r, C_r)$ can be viewed as a two-key sorting process. Given all classification decision pairs $(E_r^i, C_r^i)$ for the input $X_r$, a ranked list can be built by considering the BLEU score of $E_r^i$ in each pair as the primary key and the D(•) score as the secondary key. The top ranked pair is the correct classification decision, while all remaining pairs are incorrect/competing decisions.

To build the set of competing decision pairs $U_r$, the following rules can be applied to ensure the correctness of the MCE framework. In a top-down approach of the list that begins from the second decision pair (the first competing decision), each time a distinct translation hypothesis $E_r^i$ is detected, if the corresponding recognition $C_r^i$ is not included in any pairs already in $U_r$, this $(E_r^i, C_r^i)$ pair is added into $U_r$. If there already is a pair containing $C_r^i$ in $U_r$, this pair is ignored and the next pair is checked until all recognition hypotheses are consumed. Note that this procedure ensures that $C_r^0$ is not equal to any of $C_r^i$ in competing pairs in $U_r$, which prevents the contribution cancellation in the MCE update if both the correct and competing decisions contain the same hypothesis. This also ensures that every speech recognition hypothesis is used to provide discriminative information for the final translation decision (it is common that top translation hypotheses always come from the first one or two speech recognition hypotheses).

After collecting the competing set $U_r$, a class-specific misclassification function $d_r(•)$ can be defined to calculate the raw loss of the current classification decisions given $X_r$. Formally, $$d(X_r) = -D(E_r^0, C_r^0; X_r) + \log\left[\frac{1}{|U_r|}\sum_i^{|U_r|} \exp(\eta D(E_r^i, C_r^i; X_r))\right]^{\frac{1}{\eta}}$$

This raw loss can be smoothed by the sigmoid function as, $$l_r(X_r) = \frac{1}{1 + \exp(-\alpha d_r(X_r) + \beta)}$$

where $\eta$, $\alpha$, and $\beta$ are the standard parameters in the MCE training. Summing up loss from all training samples, the total loss L is defined as, $$L = \sum_r l_r(X_r)$$

or expressed in a different formulation as, $$L(A^{(t)}, LM_c^{(t)}, TM^{(t)}) = \sum_r l_r(X_r)$$

where $A^{(t)}$, $LM_c^{(t)}$, $TM^{(t)}$ is the current acoustic model, Chinese language model, and translation model, respectively. Note that the translation model includes an English language model. For the SUT task, the L(•) is the MCE objective function. By minimizing this objective function L and jointly updating these three models, the MCE training criterion can be applied to the SUT system.

Following is a description related to parameter updating. Although theoretically there are three models (the acoustic model, Chinese language model, and the translation model) that can be updated, the update of the acoustic model is not performed in this example application.

Parameter update of the language model. Since the current translation model includes an English language model, parameter update methods for both language models is described. Using the steepest descent method, the partial derivative of the total loss function L with respect to the language model parameters can be used for the update. Note that in the following discussion, to ease the probability notations, it is assumed that the language model is bigram, while the general calculation process is suitable for n-gram language models.

Let $P(w_x|w_y)$ denote the bigram log-probability of the word $w_x$ given $w_y$. The update method can be derived by, $$P(w_x \mid w_y)^{t+1} = P(w_x \mid w_y)^t - \epsilon_{LM} \sum_r \frac{\partial l_r(d_r(X_r))}{\partial P(w_x \mid w_y)}$$

$$= P(w_x \mid w_y)^t - \epsilon_{LM} \alpha \sum_r l_r(d_r(X_r))$$

$$[1 - l_r(d_r(X_r))] \frac{\partial (d_r(X_r))}{\partial P(w_x \mid w_y)}$$

where $\epsilon_{LM}$ is the learning rate for the language model. Recall that for each Chinese spoken utterance input $X_r$, by sorting the recognition and translation pairs $(E_r^i, C_r^j)$ based on the BLEU score of $E_r^i$ and $D(E_r^i, C_r^j; X_r)$, the correct classification pair $(E_r^0, C_r^0)$ and the set $U_r$ can be obtained containing all competing pairs. Let $N(E_r^i, w_x, w_y)$ denote the number of times the bigram $w_x w_y$ appears in sentence $E_r^i$. The log-probability of the sentence $E_r^i$ can be written as, $$P(E_r^i) = \log \left[ \prod_{w_x, w_y} P(w_x \mid w_y)^{N(E_r^i, w_x, w_y)} \right]$$

$$= \sum_{w_x, w_y} N(E_r^i, w_x, w_y) P(w_y \mid w_x)$$

Given $(E_r^0, C_r^0)$ and the competing set $U_r$ for $X_r$, the partial derivative of $d_r(X_r)$ can be obtained for English bigrams as, $$\frac{\partial d_r(X_r)}{\partial P(w_x \mid w_y)} = -N(E_r^0, w_x, w_y) + \sum_i^{|U_r|} H_r^i N(E_r^i, w_x, w_y)$$

where $$H_r^i = \frac{\exp[\eta D(C_r^i, E_r^i; X_r)]}{\sum_i^{|U_r|} \exp[\eta D(C_r^i, E_r^i; X_r)]}$$

is the weighting factor. Note that replacing every $E_r^i$ with its corresponding $C_r^i$, the Chinese language model update method can be obtained. After updating, the log-probabilities of bigrams appearing in $E_r^0$ or $C_r^0$ but not appearing in $(E_r^i, C_r^i) \in U_r$ will increase.

In contrast, the log-probabilities of bigrams in competing pairs, but not in $E_r^0$ or $C_r^0$ will decrease. Note that bigram probabilities can be re-normalized and the corresponding back-off weights can be re-calculated after the entire update process is performed.

Parameter update for the translation model. In this example, only phrase-based translation models are considered. The frequently used phrase-based translation model $P(E_r|C_r)$ can be further decomposed into the following terms.

$$P(E_r|C_r) = P^P(E_r|C_r) \cdot P^R(E_r|C_r) \cdot P(E_r) \cdot \omega^{Length(E_r)}$$

where $P^P(\bullet)$ is the phrase table translation probability, $P^R$ is the reordering probability, and $\omega$ is the length penalty of the translation output. Since update of the English model $P(E_r)$, has been previously described, here, the focus is only on the phrase table translation model $P^P(E_r|C_r)$ and the reordering model $P^R(E_r|C_r)$. In that the reordering model may perform quite differently in different language pairs, update of the phrase translation table model is only addressed.

Given an alignment $A_r$ that aligns phrases in $E_r$ and $C_r$, the phrase translation probability of the sentence pair $E_r$ and $C_r$ is defined as, $$P^P(E_r \mid C_r) = \prod_{(p_e, p_c) \in A_r} P(p_e \mid p_c) P(p_c \mid p_e) L(p_e \mid p_c) L(p_c \mid p_e)$$

where $P(\bullet)$ is the phrase translation probability in both direction and $L(\bullet)$ is the lexicon weighting factor for phrases in both direction. According to a phrase extraction algorithm, the lexicon weighting factor is fixed when a particular phrase pair is extracted. Consequently, $L(\bullet)$ is left unchanged and only update the phrase translation probability $P(\bullet)$.

The collection of phrase pairs can be viewed as a language model capturing phrase co-occurrence between two languages. To update the phrase translation probability, the same update method can be used as in the language model update. Let $P(p_x|p_y)$ denote the log-probability of the phrase translation from $p_y$ to $p_x$. The update method can be given by, $$P(p_x \mid p_y)^{t+1} = P(p_x \mid p_y)^t - \epsilon_{PH} \sum_r \frac{\partial l_r(d_r(X_r))}{\partial P(p_x \mid p_y)}$$

$$= P(p_x \mid p_y)^t - \epsilon_{PH} \alpha \sum_r l_r(d_r(X_r))$$

$$[1 - l_r(d_r(X_r))] \frac{\partial d_r(X_r)}{\partial P(p_x \mid p_y)}$$

where $\epsilon_{pH}$ is the learning rate for phrase translation probability update. Let $A_r^i$ denote the phrase alignment in the sentence pair $(E_r^i, C_r^i)$, the partial derivative of $d_r(X_r)$ can be given by, $$\frac{\partial d_r(X_r)}{\partial P(p_x \mid p_y)} - N(A_r^0, p_x, p_y) + \sum_i^{|U_r|} H_r^i N(A_r^i, p_x, p_y)$$

where $N(A_r^i, p_x, p_y)$ counts the number of the occurrence of the phrase pair $(p_x, p_y)$ in the phrase alignment $A_r^i$ and $H_r^i$ is the same as above. Note that the update process is done in both translation direction (both $P(p_x|p_y)$ and $P(p_y|p_x)$ are updated. After updating, all phrase pair probabilities are be re-normalized.

Figure 4:
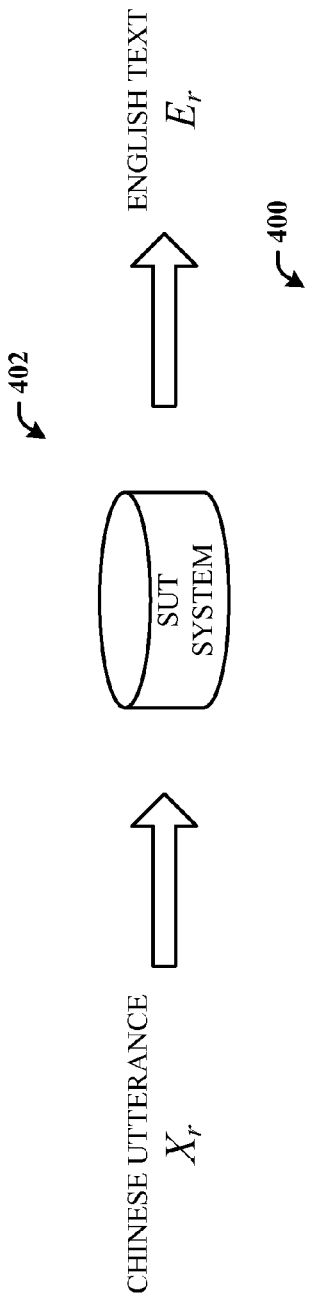
FIG. 4 illustrates a decision rule that can be employed for a spoken utterance translation.

FIG. 4 illustrates a decision rule 400 that can be employed for a spoken utterance translation 402.

Figure 5:
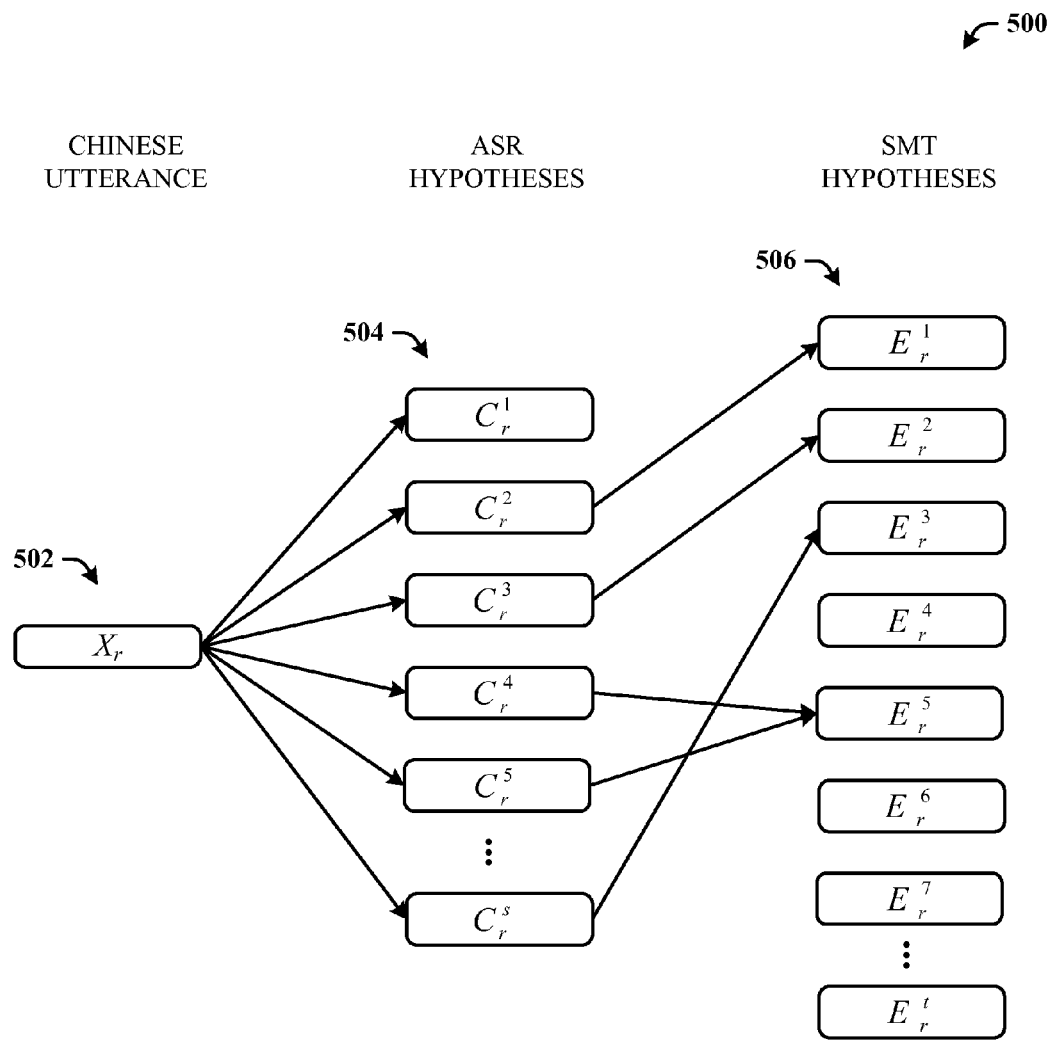
FIG. 5 illustrates a diagram for max approximation employed for the disclosed spoken utterance translation architecture.

FIG. 5 illustrates a diagram 500 for max approximation employed for the disclosed spoken utterance translation architecture. The diagram shows the Chinese spoken utterance input 502, the corresponding ASR output (hypotheses) 504, and the translation hypotheses 506.

The bracketed section of the max approximation below represents the translation of the ASR hypotheses to the SMT hypotheses.

$$\hat{E}_r \approx \arg\max_{E_r} \left[ \max_{C_r} P(E_r \mid C_r) P(X_r \mid C_r) P(C_r) \right]$$

Following is a general framework for ST where the input speech signal X is first fed into the ASR module. Then the ASR module generates a recognition output set $\{F\}$, which is in the source language. The recognition hypothesis set $\{F\}$ is passed to the MT module to obtain the translation sentence E in the target language. In one example, an N-best list is used as the interface between ASR and MT. In the following, F represents an ASR hypothesis in the N-best list.

For a unified log-linear model, the optimal translation $\hat{E}$ given the input speech signal X is obtained via the decoding process according to, $$\hat{E} = \arg\max_E P(E|X) \quad (1)$$

Based on law of total probability, $$P(E|X) = \sum_F P(E, F|X)$$

Then the posterior probability of the (E, F) sentence pair given X can be modeled through a log-linear model:

$$P(E, F|X) = \frac{1}{Z} \exp\left\{\sum_i \lambda_i \log \varphi_i(E, F, X)\right\}$$

where, $$Z = \sum_{E,F} \exp\left\{\sum_i \lambda_i \log \varphi_i(E, F, X)\right\}$$

is the normalization denominator to ensure that the probabilities sum to one. In the log-linear model, $\{\phi_i(E,F,X)\}$ are the feature functions empirically constructed from E, F, and X. The only free parameters of the log-linear model are the feature weights, i.e., $\Lambda=\{\lambda_i\}$. Details of these features are provided below.

The full set of feature functions constructed and used in the speech translation system are derived from both the ASR and the MT modules, as listed below:

Acoustic model (AM) feature: $\phi_{Am}(E,F,X)=p(X|F)$, which is the likelihood of speech signal X given the recognition hypothesis F, computed from the AM of the source language;

Source language model (LM) feature: $\phi_{SLM}(E,F,X)=P_{LM}(F)$, which is the probability of F computed from a N-gram LM of the source language;

ASR hypothesis length: $\phi_{SWC}(E,F,X)=e^{|F|}$ is the exponential of the word count in the source sentence F, (this is also referred to as word insertion penalty);

Forward phrase translation feature: $\phi_{F2Eph}(E,F,X)=P_{TMph}(E|F)=\Pi_k p(\tilde{e}_k|\tilde{f}_k)$ where $\tilde{e}_k$ and $\tilde{f}_k$ are the k-th phrase in E and F, respectively, and $p(\tilde{e}_k|\tilde{f}_k)$ is the probability of translating $\tilde{f}_k$ to $\tilde{e}_k$;

Forward word translation feature: $\phi_{F2Ewd}(E,F,X)=P_{TMwd}(E|F)=\Pi_k \Pi_m \Sigma_n p(e_{k,m}|f_{k,n})$, where $e_{k,m}$ is the m-th word of the k-th target phrase $\tilde{e}_k$, $f_{k,n}$ is the n-th word in the k-th source phrase $\tilde{f}_k$, and $p(e_{k,m}|f_{k,n})$ is the probability of translating word $f_{k,n}$ to word $e_{k,m}$ (this is also referred to as the lexical weighting feature);

Backward phrase translation feature: $\phi_{E2Fph}(E,F,X)=P_{TMph}(F|E)=\Pi_k p(\tilde{f}_k|\tilde{e}_k)$, where $\tilde{e}_k$ and $\tilde{f}_k$ are defined as above;

Backward word translation feature: $\phi_{E2Fwd}(E,F,X)=P_{TMwd}(F|E)=\Pi_k \Pi_n \Sigma_m p(f_{k,n}|e_{k,m})$, where $e_{k,m}$ and $f_{k,n}$ are defined as above;

Count of NULL translations: $\phi_{NC}(E,F,X)=e^{|Null(F)|}$ is the exponential of the number of the source words that are not translated (i.e., translated to NULL word in the target side);

Count of phrases: $\phi_{PC}(E,F,X)=e^{|\{(\tilde{e}_k,\tilde{f}_k), k=1, \ldots K\}|}$ is the exponential of the number of phrase pairs;

Translation length: $\phi_{TWC}(E,F,X)=e^{|E|}$ is the exponential of the word count in translation E;

Hierarchical phrase segmentation and reordering feature: $\phi_{Hiero}(E,F,X)=P_{hr}(S|E,F)$ is the probability of particular phrase segmentation and reordering S, given the source and target sentence E and F; and Target language model (LM) feature: $\phi_{TLM}(E,F,X)=P_{LM}(E)$, which is the probability of E computed from an N-gram LM of the target language.

The disclosed architecture can use a hierarchical phrase-based MT module, which is based on probabilistic synchronous context-free grammar (PSCFG) models that define a set of weighted transduction rules. These rules describe the translation and reordering operations between source and target languages. In training, the MT module is learned from parallel training data; and in runtime, the decoder chooses the most likely rules to parse the source language sentence while synchronously generating the target language output. Compared with a simple phrase-based MT, the hierarchical MT supports the translation of non-contiguous phrases with more complex segmentation and re-ordering, and also gives better translation performance.

With respect to training the feature weights, the free parameters of the log-linear model (the weights (denoted by $\Lambda$) of these features) can be trained by maximizing the BLEU score of the final translation on a dev set, that is, $$\hat{\Lambda} = \arg\max_\Lambda BLEU(E^*, \hat{E}(\Lambda, X))$$

where $E^*$ is the translation reference(s), and $\hat{E}(\Lambda, X)$ is the translation output, which is obtained through the decoding process according to equation (1) given input speech X and feature weights $\Lambda$. In the experiments, an existing search method is adopted to optimize the feature weights in experiments.

In the following example, the data for acoustic model training is obtained from a switchboard telephony speech dataset. A Gaussian mixture model (GMM) based continuous density HMM (hidden Markov model) is used for acoustic modeling. The MT component is trained on the English-Chinese parallel corpus, and includes approximately seven million parallel sentence pairs. A hierarchical phrase-based translation system is trained from these parallel data.

The example employs English-to-Chinese lecture translation tasks. A speaker delivered the talk in English, and the ST task is to translate the English lecture into Chinese. A two-fold cross-validation is performed in the following evaluation by splitting the sentences of the data into two equal parts, and then training the log-linear model using the first half of the sentences and applying the trained model to decode the second half of the sentences, and vice versa. The two parts of testing outputs are merged and the overall results measured. It is to be understood, however, that with larger number of reference samples, the two-fold cross validation need not be utilized.

With respect to results, the end-to-end ST performance is evaluated using a log-linear model. The baseline is a simple cascading ST model (the ASR module generates 1-best recognition output, and then it is fed into the MT module to generate the final translation output). In the baseline, the ASR module is tuned for WER (word error rate) and the MT module is tuned for BLEU with clean English text as the input. In the log-linear model based approach, a 20-best list is used as the interface between ASR and MT, and BLEU is used for optimizing the log-linear model's parameters.

Global optimization of all feature weights in the log-linear model yields a 1.45% BLEU score improvement compared with a cascading baseline even though WER increased, which shows that an optimal setting tuned by WER does not necessarily lead to the optimal translation result.

Below are presented two representative examples to explain how some ASR outputs with more "word errors" can correlate with better translation. Given that this is an English-to-Chinese example, the transcript and recognition outputs are provided in English, and the translated outputs are provided in Chinese characters.

In the first example (Example 1), the transcription input is "It is great seeing you all here today." The speech recognition output B (Recognition B) contains one more insertion error than output A (Recognition A)—the word "to". However, the inserted word "to" in Recognition B makes the whole sentence grammatical correct. The inserted word "to" also provides context that helps determine the meaning of "great", as well as the correct word order of the translation.

EXAMPLE 1

| | |
|---|---|
| Transcript | It is great seeing you all here today |
| Translation ref. | 今天很高兴在这里见到你们 |
| Recognition A | Let's great see you all here today |
| Translation A | 今天在这里看到你们让我们好 |
| Recognition B | Let's great to see you all here today |
| Translation B | 我们今天很高兴这里见到你们 |

In the second example (Example 2), the transcription input is "I didn't every really wanna do this." Speech recognition output B contains two more errors ("ve never") than output A. However, output B chooses the phrase "want to", which causes two ASR "errors", rather than the colloquial word "wanna", which is correctly recognized. The misrecognized phrase "want to", however, is plentifully represented in the formal text that is used for MT training, and hence, leads to correct translation. (The remaining recognition errors in both outputs A and B for this sentence do not change the meaning, and therefore do not cause translation errors.)

EXAMPLE 2

| | |
|---|---|
| Transcript | I didn't every really wanna do this |
| Translation ref. | 我从来没有真的想要这么做 |
| Recognition A | I can never really wanna do this |
| Translation A | 我永远不能真的想 |
| Recognition B | I've never really want to do this |
| Translation B | 我从来没有真的要这么做 |

These examples and numerous other examples (not described) lead to the conclusion that the words that signify syntactic categories can be recognized correctly by the ASR component, a task that can be accomplished in the BLEU-optimized approach, while the use of the conventional WER-optimized approach to train ASR does not accomplish this goal.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
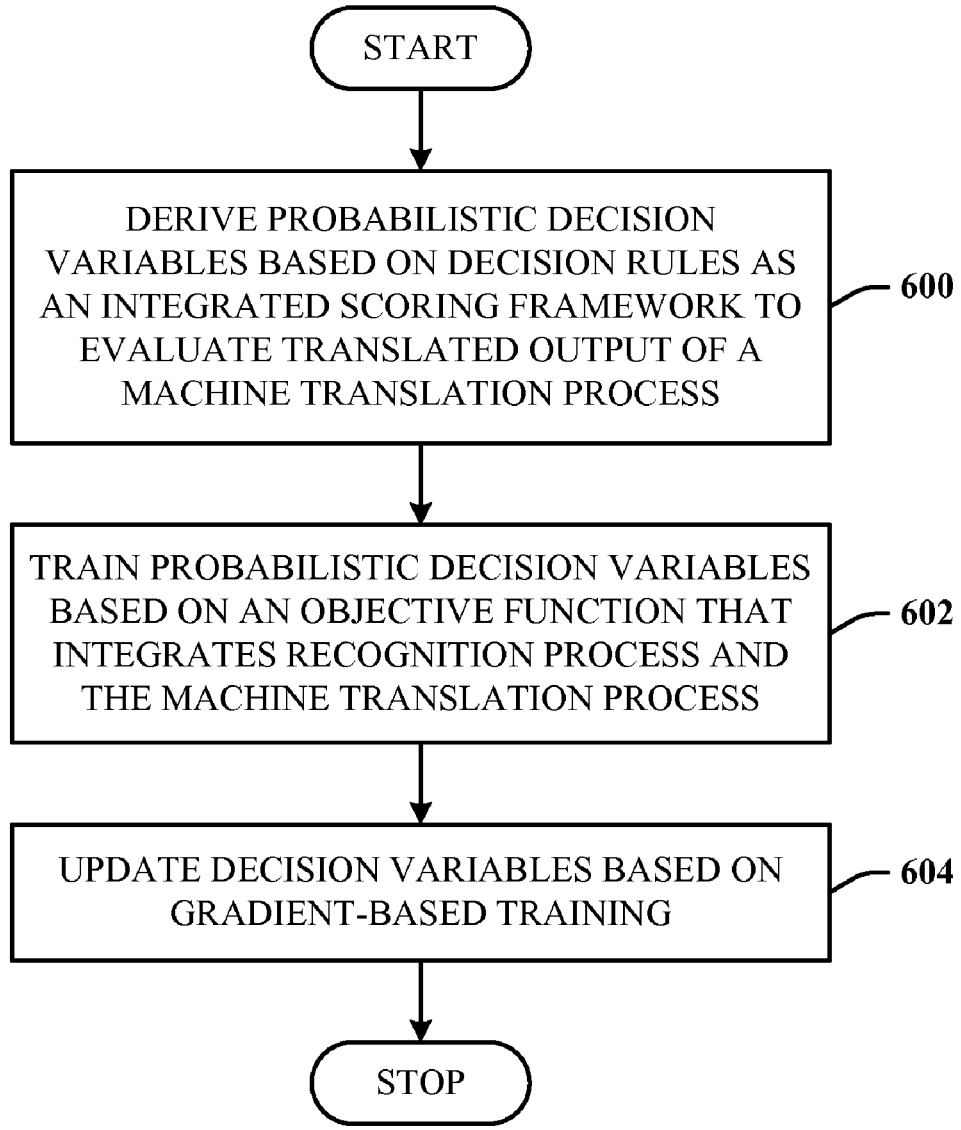
FIG. 6 illustrates a computer-implemented translation method in accordance with the disclosed architecture.

FIG. 6 illustrates a computer-implemented translation method in accordance with the disclosed architecture. At 600, probabilistic decision variables are derived based on decision rules, as an integrated scoring framework to evaluate translated output of a machine translation process. At 602, the probabilistic decision variables are trained based on an objective function that integrates a speech recognition process and the machine translation process. At 604, the decision variables are updated based on gradient-based training.

Figure 7:
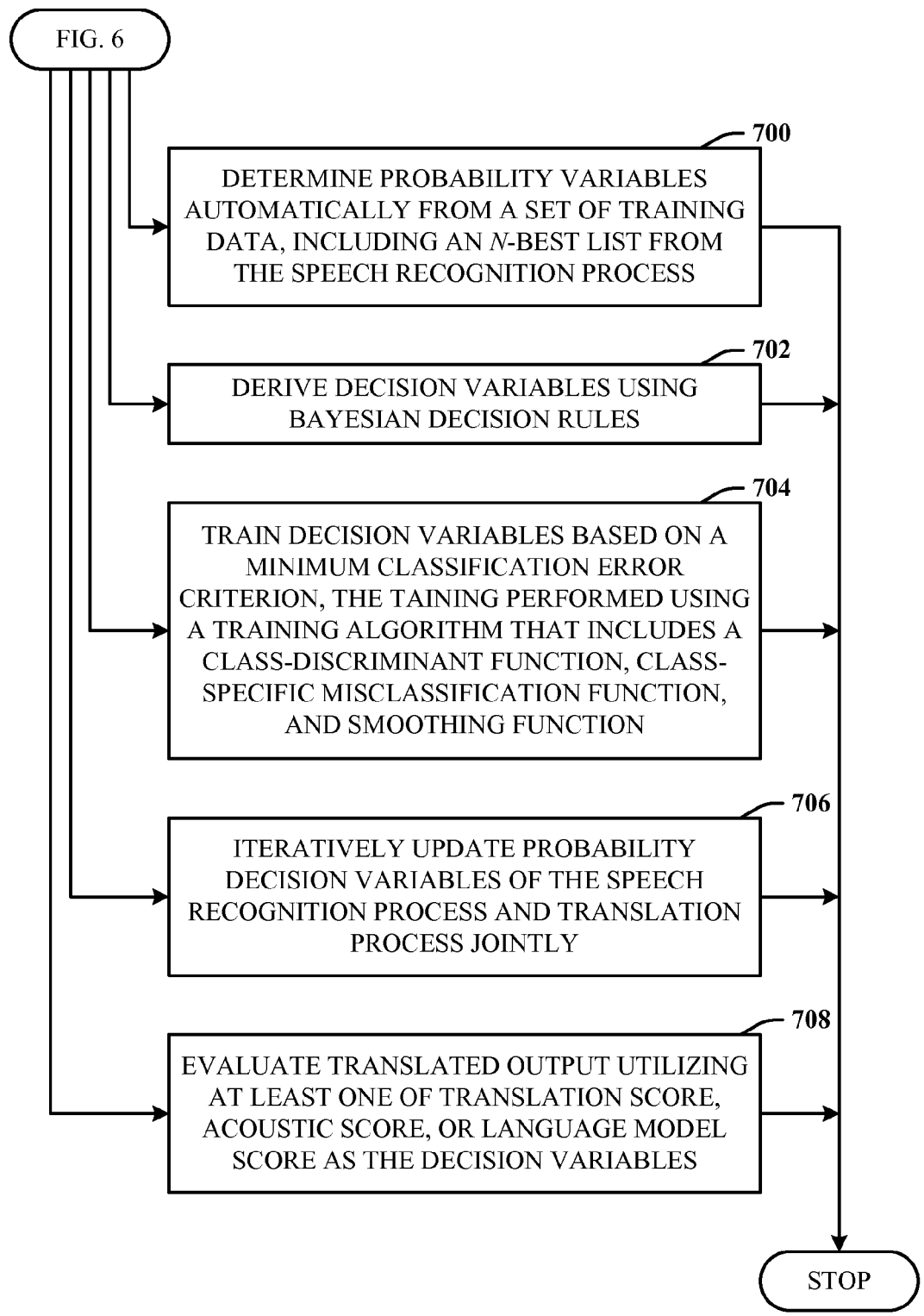
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, the probability variables automatically determined from a set of training data, including an n-best list from the speech recognition process. At 702, the decision variables are defined using Bayesian decision rules. At 704, a training algorithm is defined based on a minimum classification error criterion, the algorithm includes a class-discriminant function, class-specific misclassification function, and smoothing function. At 706, the probability variables of the speech recognition process and translation process iteratively updates directly. At 708, a translation score, acoustic score, and a language model score are utilized as the decision variables.

As a general, but not all inclusive summary, a novel integrative scoring and discriminative training framework is disclosed for spoken utterance translation. The application to spoken language translation presents special challenges and implementation subtleties, which are addressed herein. Using existing ASR and SMT systems to build an SUT system, the integrative scoring technique provides an end-to-end estimation directly from spoken utterance to translated text, alleviating training/decoding mismatch problem introduced in the combination. Additionally, an MCE-based discriminative training method can be applied to further optimize the combined SUT system jointly. A set of steepest descent based update rules are developed to update language models in both ASR and SMT as well as the phrase table model in the SMT system.

In alternative implementations, since the current datasets do not include audio recordings, the ASR parameters are not accessible in the MCE update. If audio data becomes available, the ASR parameters can be updated to further enhance a fully end-to-end MCE framework for the SUT task. Additionally, since the reordering model in the SMT system plays a role in some language pairs, an update method for the reordering model may further improve the SUT performance for particular language pairs.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
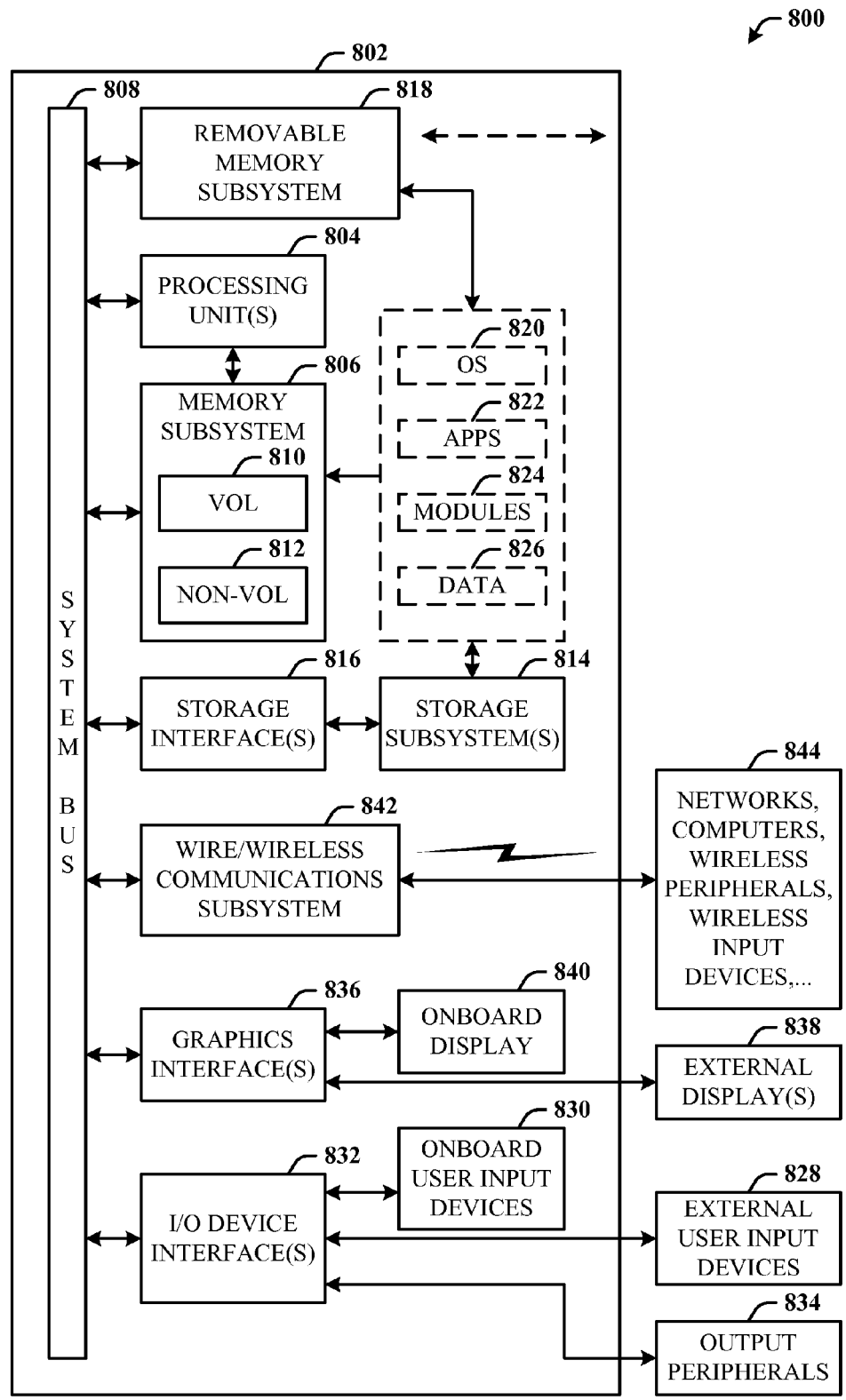
FIG. 8 illustrates a block diagram of a computing system that executes an integrative and discriminative framework in accordance with the disclosed architecture.

Referring now to FIG. 8, there is illustrated a block diagram of a computing system 800 that executes an integrative and discriminative framework in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the entities and components of the system 100 of FIG. 1, the entities and components of the system 200 of FIG. 2, the data flow diagram 300 of FIG. 3, the decision rule 400 of FIG. 4, the diagram 500 of FIG. 5, and the methods represented by the flowcharts of FIGS. 6 and 7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented training system for speech translation, comprising:
   a discriminative training component derived from a decision rule of a speech translation component, the speech translation component recognizes speech input using a recognition process and translates a recognition output to multiple hypotheses as translation output using a machine translation process, the discriminative training component includes an objective function that integrates the recognition process and the machine translation process; and
   a processor that executes computer-executable instructions associated with at least the training component.

2. The system of claim 1, further comprising a scoring component that scores the multiple hypotheses of the machine translation process based on the decision rule and outputs a final set of translated output from the multiple hypotheses.

3. The system of claim 1, wherein the decision rule is a Bayesian decision rule.

4. The system of claim 1, wherein the decision rule includes a translation score, acoustic score, and language model score to refine the multiple hypotheses and determine a translation candidate.

5. The system of claim 1, wherein the decision rule defines decision variables to determine the translation output of the translation component, the decision variables are automatically trained using minimum classification error criterion to optimize parameters in the recognition process and the machine translation process.

6. The system of claim 5, wherein the training component utilizes gradient-based training on the objective function to update the variables.

7. The system of claim 1, wherein the training component utilizes a class-discriminant function.

8. The system of claim 1, wherein the training component utilizes a class-specific misclassification function.

9. The system of claim 1, wherein the training component utilizes a smoothing function from which is derived a total loss function.

10. A computer-implemented training system for speech translation, comprising:
    a discriminative training component derived from a decision rule of a speech translation component, the speech translation component recognizes speech input using a recognition process and translates a recognition output to multiple hypotheses as translation output using a machine translation process, the discriminative training component includes an objective function that integrates the recognition process and the machine translation process;
    a scoring component that scores the multiple hypotheses of the statistical machine translation process based on the decision rule and outputs a final set of translated output from the multiple hypotheses; and
    a processor that executes computer-executable instructions associated with at least the training component and the scoring component.

11. The system of claim 10, wherein the decision rule is a Bayesian decision rule that defines decision variables to determine the output of the translation component, the decision variables are automatically trained using minimum classification error criterion to optimize parameters in the recognition process and the machine translation process.

12. The system of claim 10, wherein the decision rule includes translation scores, acoustic scores, and foreign language model scores to refine the translation hypotheses and determine a translation candidate.

13. The system of claim 10, wherein the training component utilizes gradient-based training on the objective function to update the variables.

14. The system of claim 10, wherein the training component utilizes a class-discriminant function, defining a class-specific misclassification function, and a smoothing function from which is derived a total loss function.

15. A computer-implemented training method, comprising acts of:

deriving probabilistic decision variables based on decision rules as an integrated scoring framework to evaluate translated output of a machine translation process;

training the probabilistic decision variables based on an objective function that integrates a speech recognition process and the machine translation process;

updating the decision variables based on gradient-based training;

and utilizing a processor to execute the objective function.

16. The method of claim 15, further comprising determining the probability variables automatically from a set of training data, including an n-best list from the speech recognition process.

17. The method of claim 15, further comprising deriving the decision variables using Bayesian decision rules.

18. The method of claim 15, further comprising training the decision variables based on a minimum classification error criterion, the training performed using a training algorithm that includes a class-discriminant function, class-specific misclassification function, and smoothing function.

19. The method of claim 15, further comprising iteratively updating the probability decision variables of the speech recognition process and translation process jointly.

20. The method of claim 15, further comprising evaluating the translated output utilizing at least one of a translation score, acoustic score, or a language model score as the decision variables.

* * * * *